(12) United States Patent
Manuilov (10) Patent No.: US 7,793,122 B1
(45) Date of Patent: Sep. 7, 2010

(54) POWER MANAGEMENT METHOD AND SYSTEM ORGANIZING AN EXECUTION ORDER OF EACH COMMAND IN A PLURALITY OF COMMANDS BASED ON A PREDICTED PROBABILITY OF SUCCESS OF EACH COMMAND

(75) Inventor: Konstantin Manuilov, Tallinn (EE)

(73) Assignee: Symantec Corporation, Mountain View, CA (US)

( * ) Notice: Subject to any disclaimer, the term of this patent is extended or adjusted under 35 U.S.C. 154(b) by 739 days.

(21) Appl. No.: 11/741,137

(22) Filed: Apr. 27, 2007

(51) Int. Cl.
*G06F 1/00* (2006.01)
*G06F 1/32* (2006.01)
*G06F 9/00* (2006.01)

(52) U.S. Cl. .................. 713/300; 713/320; 712/233

(58) Field of Classification Search ............. 713/300
See application file for complete search history.

(56) References Cited

U.S. PATENT DOCUMENTS

| | | | | |
|---|---|---|---|---|
| 6,334,150 | B1* | 12/2001 | Cromer et al. | 709/223 |
| 7,039,819 | B1* | 5/2006 | Kommrusch et al. | 713/322 |
| 7,251,350 | B2* | 7/2007 | Tsirkel et al. | 382/118 |
| 7,353,040 | B2* | 4/2008 | Baker et al. | 455/522 |
| 7,590,873 | B2* | 9/2009 | Takahashi et al. | 713/300 |

OTHER PUBLICATIONS

"WMI and the Power Management Tab," dated Apr. 3, 2007; webpage from http://www.osronline.com/ddkx/kmarch/wmi_884n.html.
"Intel® Active Management Technology (Intel® AMT)," dated Apr. 3, 2007; webpage from http://www.intel.com/technology/manage/iamt/.
"DMTF—Alert Standard Format (ASF)," dated Apr. 3, 2007; webpage from http://www.dmtf.org/standards/asf/.
"Windows Management Instrumentation," dated Apr. 3, 2007; webpage from http://en.wikipedia.org/wiki/Windows_Management_Instrumentation.

* cited by examiner

*Primary Examiner*—Suresh K Suryawanshi
(74) *Attorney, Agent, or Firm*—Holland & Hart (57) ABSTRACT

An exemplary computer-automated method is disclosed. The computer-automated method may include determining a plurality of commands. The plurality of commands may include first and second commands. The computer-automated method may also include performing an iterative execution process. The iterative execution process may include executing the first command on a computer and determining whether the computer performed a power management operation in response to the first command. The iterative execution process may end when the computer performs the power management operation in response to the first command. The iterative execution process may execute the second command when the computer fails to perform the power management operation in response to the first command.

20 Claims, 8 Drawing Sheets

Command Set
300

POWER MANAGEMENT METHOD AND SYSTEM ORGANIZING AN EXECUTION ORDER OF EACH COMMAND IN A PLURALITY OF COMMANDS BASED ON A PREDICTED PROBABILITY OF SUCCESS OF EACH COMMAND

BACKGROUND

The Information Technology (IT) infrastructure of a large enterprise typically includes a large number of computers. Network administrators often perform power management operations on these computers. For example, an administrator may need to install a security patch on all of the computers in the enterprise. The computers may be in various different power states and the administrator may need to fully power on each computer before installing the security patch. This task may be challenging for the administrator because the computers may be configured with various different power management technologies and settings. Thus, the administrator may need to be familiar with the power management technologies and settings of each computer in order to perform power management operations on the computers. As a result, performing power management operations on computers in the enterprise may be a time-consuming and burdensome task for the administrator.

SUMMARY

According to certain embodiments, a computer-automated method may comprise determining a plurality of commands. The plurality of commands may comprise first and second commands. The computer-automated method may also comprise performing an iterative execution process. The iterative execution process may comprise causing the first command to execute on a computer and determining whether the computer performed a power management operation in response to the first command. The iterative execution process may end when the computer performs the power management operation in response to the first command. The iterative execution process may cause the second command to execute when the computer fails to perform the power management operation in response to the first command.

In at least one embodiment, determining the plurality of commands may further comprise detecting a power management technology enabled on the computer and determining a first set of parameters that corresponds to the management technology. The first command may include the first set of parameters. Determining the plurality of commands may also comprise determining a second set of parameters that corresponds to the management technology, and the second command may include the second set of parameters.

In some embodiments, determining the plurality of commands may further comprise detecting a first management technology enabled on the computer and determining a first set of parameters that corresponds to the first management technology. The first command may implement the first set of parameters. Determining the plurality of commands may also comprise detecting a second management technology enabled on the computer and determining a second set of parameters that corresponds to the second management technology. The second command may implement the second set of parameters.

In various embodiments, the determining the plurality of commands may further comprise organizing an execution order of each command in the plurality of commands based on a predicted probability of success of each command.

According to at least one embodiment, organizing the execution order of each command in the plurality of commands may further comprise determining whether the first or second commands previously succeeded in causing the computer to perform the power management operation.

In at least one embodiment, the computer-automated method may comprise receiving an indication of a power state of the computer and determining the plurality of commands based on the power state of the computer. In some embodiments, the first command may be a management instrumentation command and the second command may be at least one of an alert format command and a management technology command. In various embodiments, the computer-automated method may further comprise receiving an indication of the power management operation and receiving an identification of the computer.

According to certain embodiments, a computer-automated method may comprise receiving a request to perform a power management operation on a computer, detecting a set of management technologies enabled on the computer, determining a first set of parameters that corresponds to the power management operation and to at least one management technology in the set of management technologies, and determining a second set of parameters that corresponds to the power management operation and to at least one management technology in the set of management technologies.

In at least one embodiment, the computer-automated method may further comprise determining a first command, and determining the first command may comprise determining the first set of parameters. The computer-automated method may also comprise determining a second command, and determining the second command may comprise determining the second set of parameters. The computer-automated method may comprise performing an iterative execution process.

In some embodiments, the iterative execution process may comprise executing the first command on the computer, determining whether the computer performed the power management operation in response to the first command, ending the iterative execution process when the computer performs the power management operation in response to the first command, and executing the second command when the computer fails to perform the power management operation in response to the first command.

In various embodiments, the set of management technologies may comprise a single management technology. According to at least one embodiment, the set of management technologies may comprise first and second management technologies, the first set of parameters may correspond to the first management technology, and the second set of parameters may correspond to the second management technology.

According to certain embodiments, a computer-automated method may comprise receiving a request to perform a power management operation on a computer, detecting a set of management technologies enabled on the computer, determining a first command that corresponds to the power management operation and to at least one management technology in the set of management technologies, and determining a second command that corresponds to the power management operation and to at least one management technology in the set of management technologies.

The computer-automated method may also comprise performing an iterative execution process. The iterative execution process may comprise executing the first command on the computer and determining whether the computer performed the power management operation in response to the first command. The iterative execution process may end when the computer performs the power management operation in response to the first command. The iterative execution process may execute the second command when the computer fails to perform the power management operation in response to the first command.

In at least one embodiment, determining the first and second commands may further comprise organizing an execution order for the first and second commands based on a predicted probability of success of each command. According to various embodiments, the set of management technologies may comprise a single management technology. In certain embodiments, the set of management technologies may comprise first and second management technologies, the first command may correspond to the first management technology, and the second command may correspond to the second management technology.

According to certain embodiments, a computer-readable medium may comprise a first set of computer-executable instructions operable to determine a plurality of commands, and the plurality of commands may comprise first and second commands. The computer-readable medium may also comprise a second set of computer-executable instructions operable to perform an iterative execution process. The iterative execution process may comprise causing the first command to execute on a computer, determining whether the computer performed a power management operation in response to the first command, ending the iterative execution process when the computer performs the power management operation in response to the first command, and causing the second command to execute when the computer fails to perform the power management operation in response to the first command.

In at least one embodiment, the first set of computer-executable instructions may be further operable to detect a management technology enabled on the computer, determine a first set of parameters that corresponds to the management technology, and determine a second set of parameters that corresponds to the management technology. The first command may include the first set of parameters, and the second command may include the second set of parameters.

In some embodiments, the first set of computer-executable instructions may be further operable to detect a first management technology enabled on the computer, determine a first set of parameters that corresponds to the first management technology, detect a second management technology enabled on the computer, and determine a second set of parameters that corresponds to the second management technology. The first command may implement the first set of parameters and the second command may implement the second set of parameters.

In various embodiments, the first set of computer-executable instructions may be further operable to organize an execution order of each command in the plurality of commands based on a predicted probability of success of each command. According to at least one embodiment, the computer-readable medium may further comprise a third set of computer-executable instructions operable to receive an indication of a power state of the computer and a fourth set of computer-executable instructions operable to determine the power management operation based on the power state of the computer.

In some embodiments, the first command may be a management instrumentation command and the second command may be at least one of an alert format command and a management technology command. According to various embodiments, the computer-readable medium may further comprise a third set of computer-executable instructions operable to receive an indication of the power management operation and a fourth set of computer-executable instructions operable to receive an identification of the computer.

BRIEF DESCRIPTION OF THE DRAWINGS

The accompanying drawings illustrate a number of exemplary embodiments and are part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments are shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The following is intended to provide a detailed description of various exemplary embodiments and should not be taken to be limiting in any way. Various exemplary methods and systems for implementing power management are described and/or illustrated herein. Many of the embodiments presented herein discuss computer systems in an enterprise network; however, the principles of the instant disclosure apply to various other types of networks and computer systems. According to certain embodiments, the power management methods presented herein may allow a network administrator to perform network management operations on various computers without needing to know the power management technologies, parameters, and/or states of any given computer. Thus, as discussed in greater detail below, embodiments of the instant disclosure may simplify and improve network power management. Embodiments of the instant disclosure may also provide various other advantages.

Figure 1:
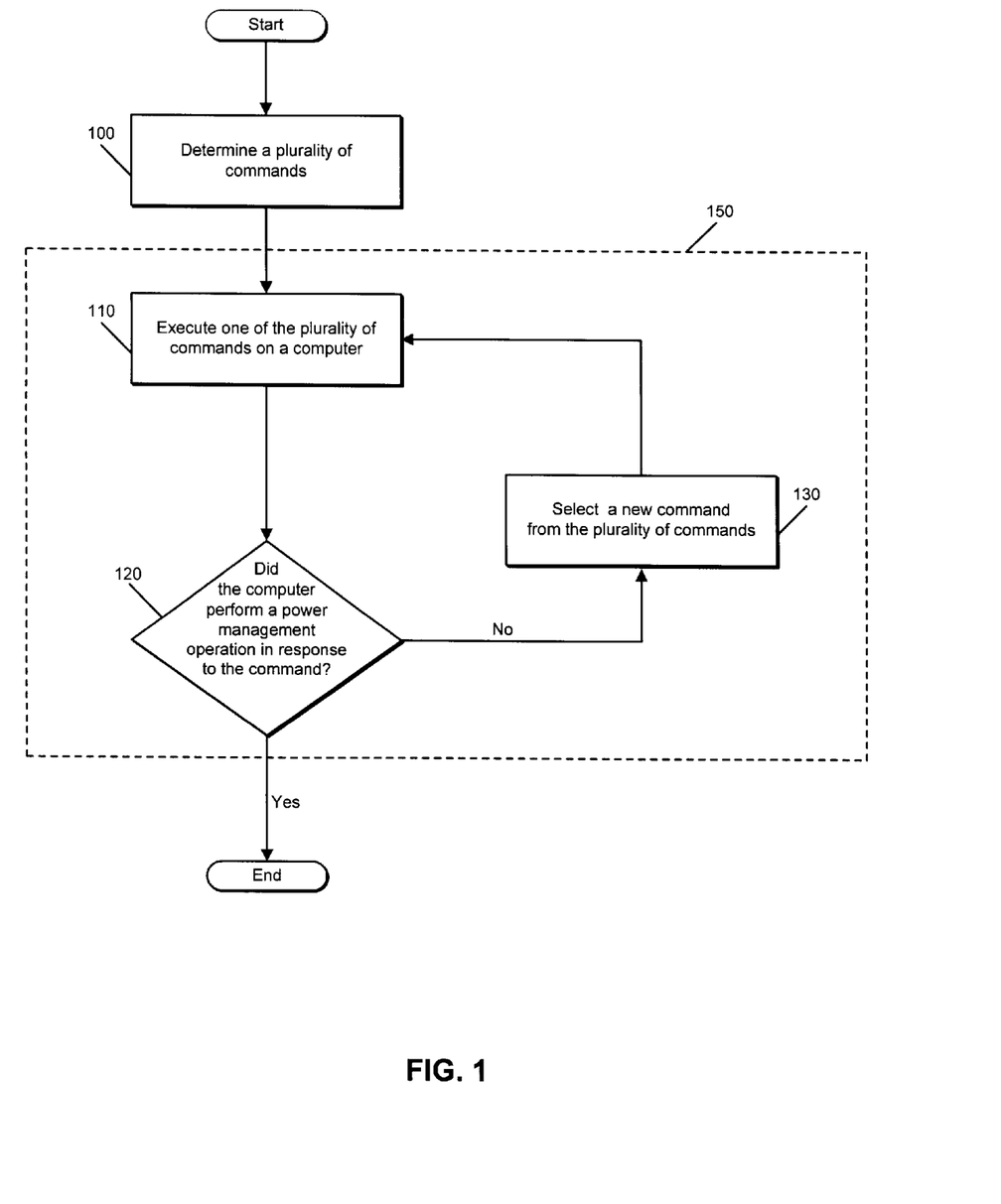
FIG. 1 is a flow diagram of an exemplary power management method according to certain embodiments.

FIG. 1 illustrates various steps in a power management method. Power management methods and operations may be performed in various contexts. As previously noted, a network administrator may need to change a computer to a powered-on state to install software programs, updates, and/or patches. A network administrator may also want to place computers in a powered off state, a hibernation state, or a standby state to conserve power. In some embodiments, a network management program may also need to change the power state of a computer. For example, the network management program may need to change the power state of a computer in order to perform scheduled updates or routine maintenance on the computer. The management program may also be scheduled to perform periodic power management operations (e.g., power down enterprise computer systems at the end of a work day).

When a power management operation needs to be performed on a computer, the administrator or management software may send a request to a power management module. A power management module may be any instruction or set of instructions capable of directing a computer to perform a power management operation. After receiving the request, the power management module may determine a plurality of commands (step 100). In some embodiments, the power management module may be programmed to determine a plurality of commands without receiving a request (e.g., the power management module may be programmed to perform a power management operation on a periodic basis).

The commands determined in step 100 may be commands configured to direct a computer to perform a power management operation. For example, the commands may be commands that initiate a power management operation on a computer. The commands may be formatted in numerous different syntaxes and may comprise various parameters and settings.

Figure 2:
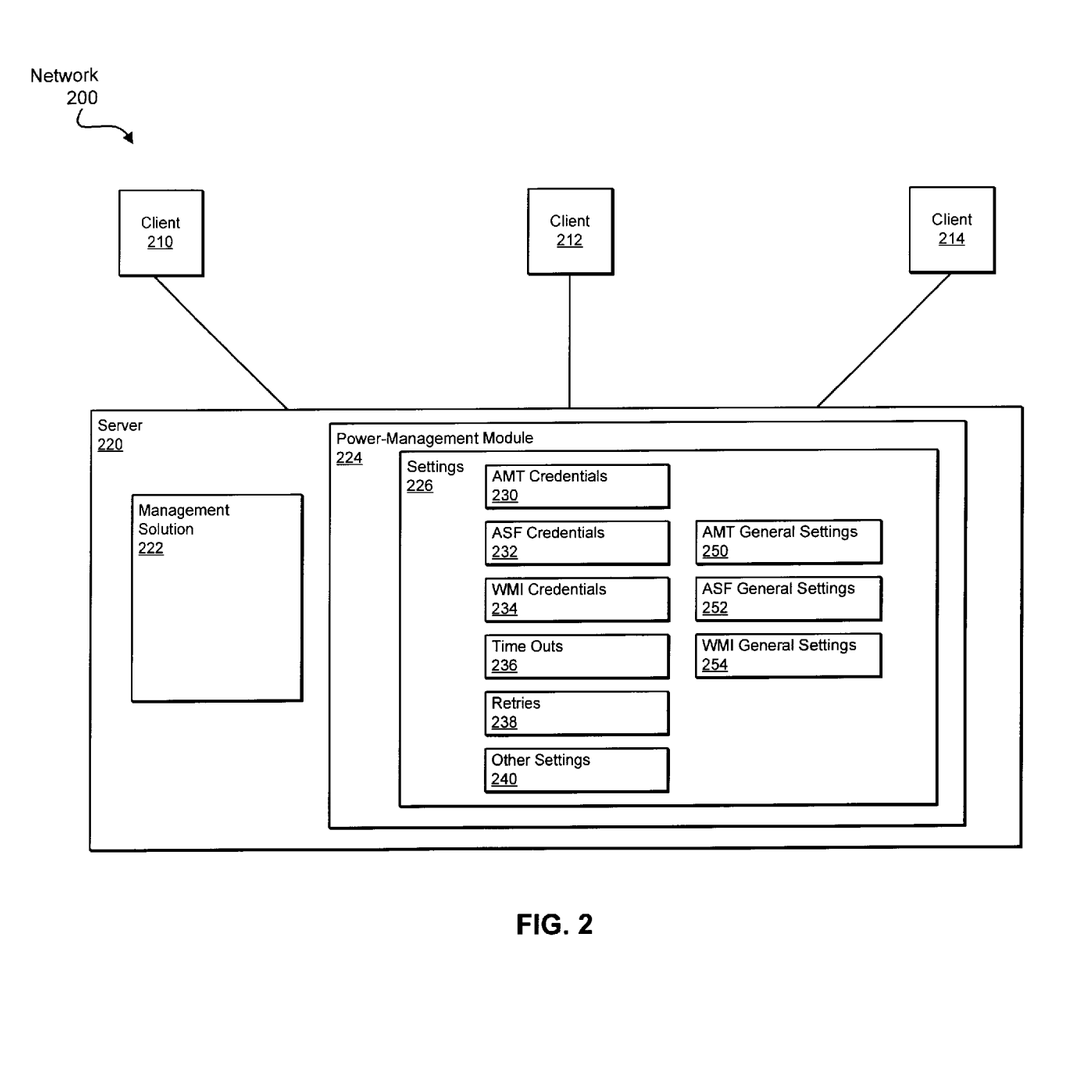
FIG. 2 is a block diagram of an exemplary network according to certain embodiments.
Figure 3:
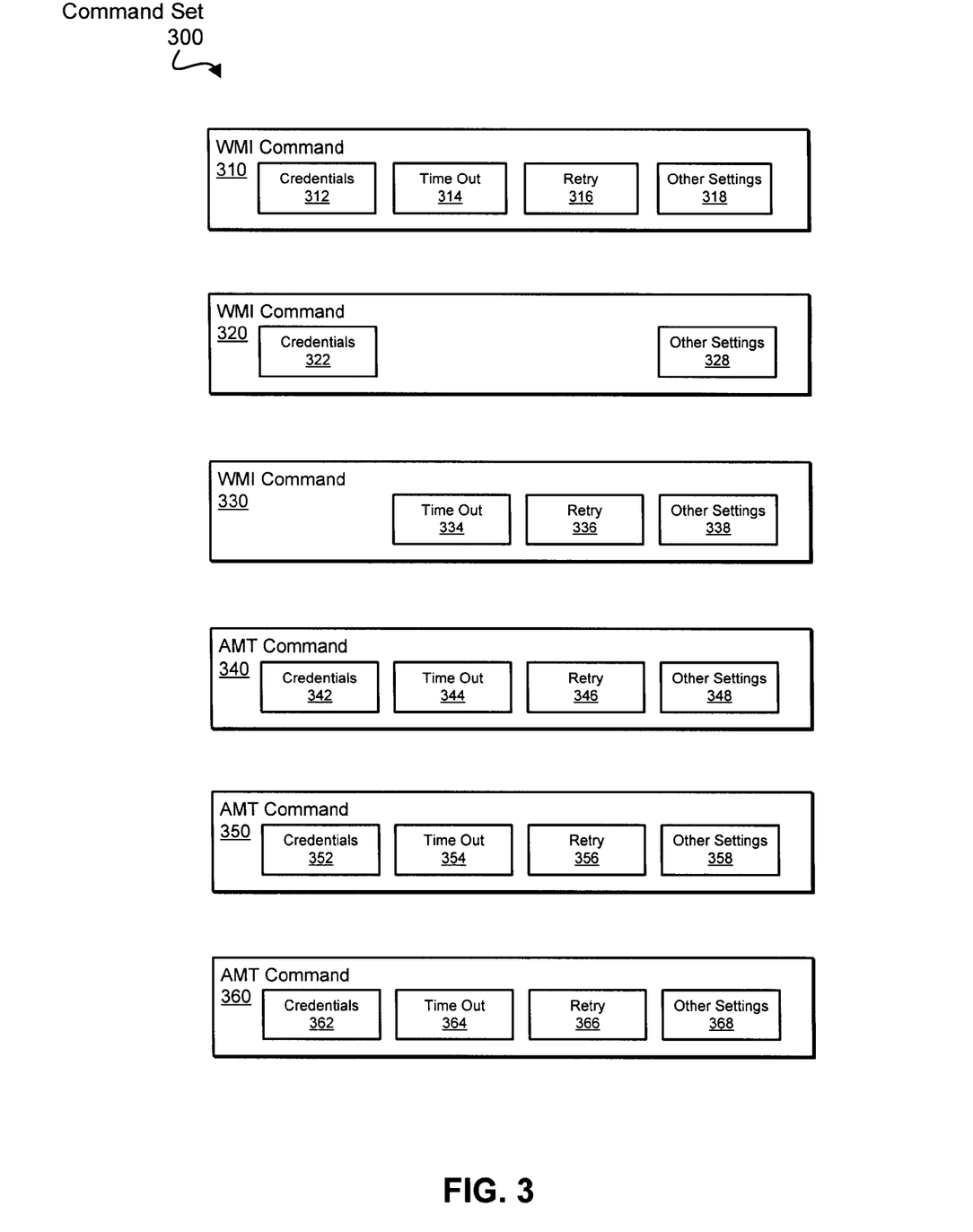
FIG. 3 is a block diagram of an exemplary command set according to certain embodiments.

Determining a plurality of power management commands may include a variety of different steps. For example, determining power management commands may comprise determining power management technologies and settings enabled on the computer. In other embodiments, a power management module may first identify power management technologies and settings enabled on a computer and then determine power management commands. After determining the power management technologies and settings enabled on the computer, the power management module may select command parameters that correspond to the enabled technologies and settings. In some embodiments, the power management module may insert the selected parameters into a general command. In other embodiments, the power management module may select a specific command with parameters that correspond to the computer's enabled technologies and settings. The description corresponding to FIGS. 2 and 3 presents additional details about selecting and creating commands.

According to some embodiments, determining a plurality of commands does not comprise the step of determining the power management technologies and configurations enabled on the computer. For example, instead of looking at a computer's management technologies, the power management module may select a set of commands based on the computer's Internet Protocol (IP) address, the computer's model number, or any other suitable feature or characteristic of the computer. In some embodiments, the power management module may select a set of commands without determining any characteristic of the computer. For example, the power management module may select a default set of commands when it cannot determine the computer's power management technologies or other characteristics.

After determining the plurality of commands, the power management module may execute one of the plurality of commands on the computer (step 110). In some embodiments, the power management module may execute the command by directing the computer to run the command. As previously noted, the command may initiate a power management operation on the computer. The power management operation may be a shutdown operation, a stand-by operation, a hibernate operation, a power-on operation, a suspend operation, a low-power operation, a full-power operation, or any other type of power operation for a computer.

The power management module may determine whether the computer successfully performed the power management operation in response to the command (step 120). In some embodiments, the computer may return a success or failure indication to the power management module. If the computer failed to perform the power management operation in response to the first command, the power management module may select a new command from the plurality of commands (step 130). The power management module may execute the new command and may determine whether the computer performed the power management operation in response to the new command.

The power management module may continue to select and execute new commands until the computer successfully performs the power management operation. In other words, the power management module may exit iterative execution process 150 after it finds a command that successfully directs the computer to perform the power management operation. According to some embodiments, the power management module may end or exit iterative execution process 150 after executing a predetermined number of commands. Iterative execution process 150 may also terminate after executing all of the commands in the plurality of commands.

Iterative execution process 150 may include additional steps or different steps than the steps illustrated in FIG. 1. In some embodiments, iterative execution process 150 may be any programming loop or iterative programming process that is capable of cycling through the execution of a plurality of commands. As previously noted, one or more of a variety of conditions may cause iterative execution process 150 to terminate.

FIG. 2 illustrates an exemplary network 200 with a server 220 connected to clients 210, 212, and 214. A management solution 222 and a power management module 224 may be installed on server 220. Management solution 222 may be a deployment solution, a patch management solution, a recovery solution, or any other type of network management software. Power management module 224 may be included in a real-time console infrastructure or may be a standalone module. In other embodiments, power management module 224 may be included in a deployment solution, a patch management solution, a recovery solution, or any other type of network or power management software. According to some embodiments, management solution 222 may comprise power management module 224.

The following discussion provides an example of how embodiments of power management may be implemented in network 200. In one example, a network administrator may desire to shut down clients 210, 212, and 214. The administrator may direct power management module 224 to perform the shutdown on each of the clients. In other embodiments, the administrator may use management solution 222 to direct the shutdowns. For example, the administrator may schedule a periodic shutdown of clients 210, 212, and 214 through management solution 222. In such embodiments, management solution 222 may direct power management module 224 to shut down clients 210, 212, and 214. Thus, either management solution 222 or the administrator may send power management module 224 a request to perform a power management operation on clients 210, 212, and 214. In other embodiments, power management module 224 may receive the request to perform a power management operation from other network devices or computer programs.

In response to the request to perform a power management operation, power management module 224 may determine a current power state of each of clients 210, 212, and 214. Power management module 224 may determine that client 210 is already shutdown and therefore no power operation needs to be performed. Power management module 224 may also determine that client 212 is fully powered on and client 214 is in a standby state.

After determining that client 212 is powered on, power management module 224 may detect a set of management technologies enabled on client 212. In some embodiments, client 212 may only include a single management technology. In such embodiments, the set of management technologies enabled on client 212 may include a single technology. In other embodiments, two or more management technologies may be enabled on client 212.

Client 212 may include (i.e., may be enabled or installed with) a software-based management instrumentation technology, such as Windows Management Instrumentation (WMI). Client 212 may also include a hardware-based management technology, such as Active Management Technology (AMT). Thus, client 212 may be referred to as being WMI and AMT enabled.

After power management module 224 detects that client 212 is WMI and AMT enabled, power management module 224 may select a set of commands that correspond to these two technologies. As previously noted, determining a set of commands may comprise one or more of a variety of steps. For example, determining a command may comprise determining the syntax of an instruction (or set of instructions) needed to initiate a power management operation for an enabled technology. In some embodiments, determining a command may also comprise determining credentials, time-outs, retries, and/or any other applicable settings for use in a computer readable instruction. Power management module 224 may determine a single command for each technology. In other embodiments, power management module 224 may determine multiple commands for each technology enabled on client 212.

According to certain embodiments, an administrator may define a set of general settings for each management technology in an enterprise. For example, the administrator may define AMT general settings 250, Alert Standard Format (ASF) general settings 252, and WMI general settings 254. Each of general settings 250, 252, and 254 may comprise credentials, time-outs, retries, and/or any other settings for a power management command. According to some embodiments, AMT general settings 250 may be sufficiently generic to work with a variety of AMT-enabled computers with different AMT configurations. Similarly, ASF general settings 252 may be sufficiently generic to work with a variety of ASF-enabled computers, and WMI general settings 254 may be sufficiently generic to work with a variety of WMI-enabled computers. The administrator may also define additional sets of settings with more specific parameters than general settings 250, 252, and 254.

In order to determine a plurality of commands for execution on client 212, power management module 224 may select sets of parameters (e.g., sets of general and/or specific settings) that correspond to the power management technologies enabled on client 212. In some embodiments, power management module 224 may select specific parameters that are combined with some parameters from AMT general settings 250 (and/or WMI general settings 254) to create the set of actual settings that are used to try to initiate a power management operation.

The sets of parameters selected by power management module 224 may be incorporated into a computer instruction (or instructions) in a syntax readable by the target technology (e.g., WMI, AFT, or AMT syntax). In other words, the parameters may be formatted in a computer-readable syntax. In some embodiments, a computer-readable instruction that incorporates the selected parameters may be referred to as a command. The term "command" may also refer to an unformatted set of parameters.

A set of commands may include any number of commands. For example, FIG. 3 illustrates a command set 300 with three WMI commands and three AMT commands. The commands in FIG. 3 may be chosen from sets of general settings or other sets of commands. Settings may be grouped in various categories in power management module 224. As shown in FIG. 2, AMT credentials 230, ASF credentials 232, and WMI credentials 234 may be grouped by technology. Time-outs 236, retries 238, and other settings 240 may also be grouped together. According to some embodiments, settings may be grouped by computer name, computer model number, internet protocol (IP) addresses, or by any other suitable criteria.

In some embodiments, instead of selecting commands with specific settings, the power management module may select the most general settings for each enabled protocol. For example, WMI command 310 may comprise WMI general settings 254. In other words, credentials 312, time-out parameter 314, retry parameter 316, and other settings 318 may be the same settings contained in WMI general settings 254. In contrast, WMI command 320 may include credentials 322 and other settings 328 that are not from WMI general settings 254. For example, credentials 322 may be credentials selected from WMI credentials 234. Similarly, WMI command 330 may include a specific time-out parameter 334 selected from time-outs 236, a specific retry parameter 336 selected from retries 238, and other specific settings 338 selected from other settings 240.

Command set 300 may also comprise AMT commands 340, 350, and 360. AMT command 340 may comprise credentials 342, time-out parameter 344, retry parameter 346, and other settings 348. AMT command 350 may comprise credentials 352, time-out parameter 354, retry parameter 356, and other settings 358. Similarly, AMT command 360 may comprise credentials 362, time-out parameter 364, retry parameter 366, and other settings 368.

Power management module 224 may determine an execution order of each of the six commands in command set 300. In some embodiments, power management module 224 may organize the commands based on a predicted probability of success of each command. In other words, power management module 224 may place a command first in the execution order if the command is the most likely to succeed in performing the power management operation on client 212. In some embodiments, power management module 224 may determine the execution order of the commands based on various other factors. For example, the execution order of the commands may be based on the maximum amount of time that can be allowed for performing the power management operation. Forceful power operations (e.g., power operations that may not allow an operating system to respond and may not allow a user to save data) may execute more quickly than graceful power operations (e.g., power operations that may allow an operating system to respond and may also allow a user to save data); thus, a command that initiates a forceful power operation may be selected to execute first when fast execution is critical.

Another factor in determining the execution order of the commands may be reliability. A reliable power management operation may minimize the impact and/or damage to a user's data on client 212. For example, a reliable shutdown operation may allow users to save their work before shutting the computer down. A command that initiates a reliable (i.e., graceful) power operation may be selected to execute first when reliability is important. In some embodiments, power management module 224 may determine a command execution order based on a single factor. In other embodiments, power management module 224 may determine a command execution order based on multiple factors.

The first command in the execution order may be WMI command 310. WMI command 310 may include security credentials 312, a time-out parameter 314, a retry parameter 316, and other settings 318. Security credentials 312 may be trusted domain suffixes, certificates, or any other type of security credential. Retry parameter 316 may define how many times power management module 224 will attempt to run command 310 before returning a failure code. For reliable protocols, the retry parameter may typically be 1, and for non-reliable protocols, the retry parameter may typically be more than 1. Time-out parameter 314 may define a wait period for power management module 224 to get results from client 212 for one command.

Power management module 224 may send WMI command 310 to client 212 for initiation of the shutdown operation. In other words, power management module 224 may cause WMI command 310 to be executed on client 212. In some embodiments, WMI command 310 may already be properly formatted for execution in a WMI environment. In other embodiments, power management module 224 may insert credentials 312, time-out parameter 314, retry parameter 316, and the other settings 318 into an instruction formatted to execute in a WMI environment. Command 310 may fail to initiate the shutdown operation because of an incorrect parameter. For example, security credentials 312 may be the wrong credentials for the WMI technology configuration of client 212. Even if a command fails to successfully initiate a shutdown operation, an attempt to run the command may be referred to as executing the command.

If client 212 fails to complete the shutdown operation in response to WMI command 310, client 212 may send an indication of the failure to power management module 224. According to some embodiments, power management module 224 may re-evaluate the execution order of command set 300 after command 310 fails. For example, if power management module 224 determines that attempting to execute WMI command 310 took too much time, it may execute an AMT command instead of executing the other two WMI commands. AMT commands may be more forceful than WMI commands and may therefore cause client 212 to shut down quickly.

In other embodiments, power management module 224 may not rearrange the execution order of command set 300. For example, power management module 224 may execute WMI command 320 after executing WMI command 310. As illustrated in FIG. 3, WMI command 320 may not include time-out or retry parameters, but WMI command 320 may have the proper security credentials (credentials 322) to successfully initiate the shutdown operation despite the missing parameters. However, client 212 may still fail to complete the shutdown operation. For example, client 212 may pause the shutdown process while waiting for a response from a user.

Power management module 224 may receive an indication that the shutdown operation failed to complete in response to WMI command 320. Power management module 224 may determine that WMI command 330 lacks security credentials and therefore could not successfully initiate the shutdown operation. Thus, power management module 224 may select AMT command 340 instead of WMI command 330 for execution on client 212.

AMT command 340 may include credentials 342, time-out parameter 344, retry parameter 346, and other settings 348. AMT command 340 may have the correct credentials for executing on client 212, and may therefore initiate a forceful AMT shutdown operation. After client 212 successfully shuts down, power management module 224 may receive an indication that the power operation completed successfully.

As previously mentioned, client 214 may be in a stand-by state. In order to shut down client 214, power management module 224 may need to change client 214 to a fully-powered on state before shutting down client 214. These power management operations may be performed in the same manner that the shutdown operation was performed on client 212.

Figure 4:
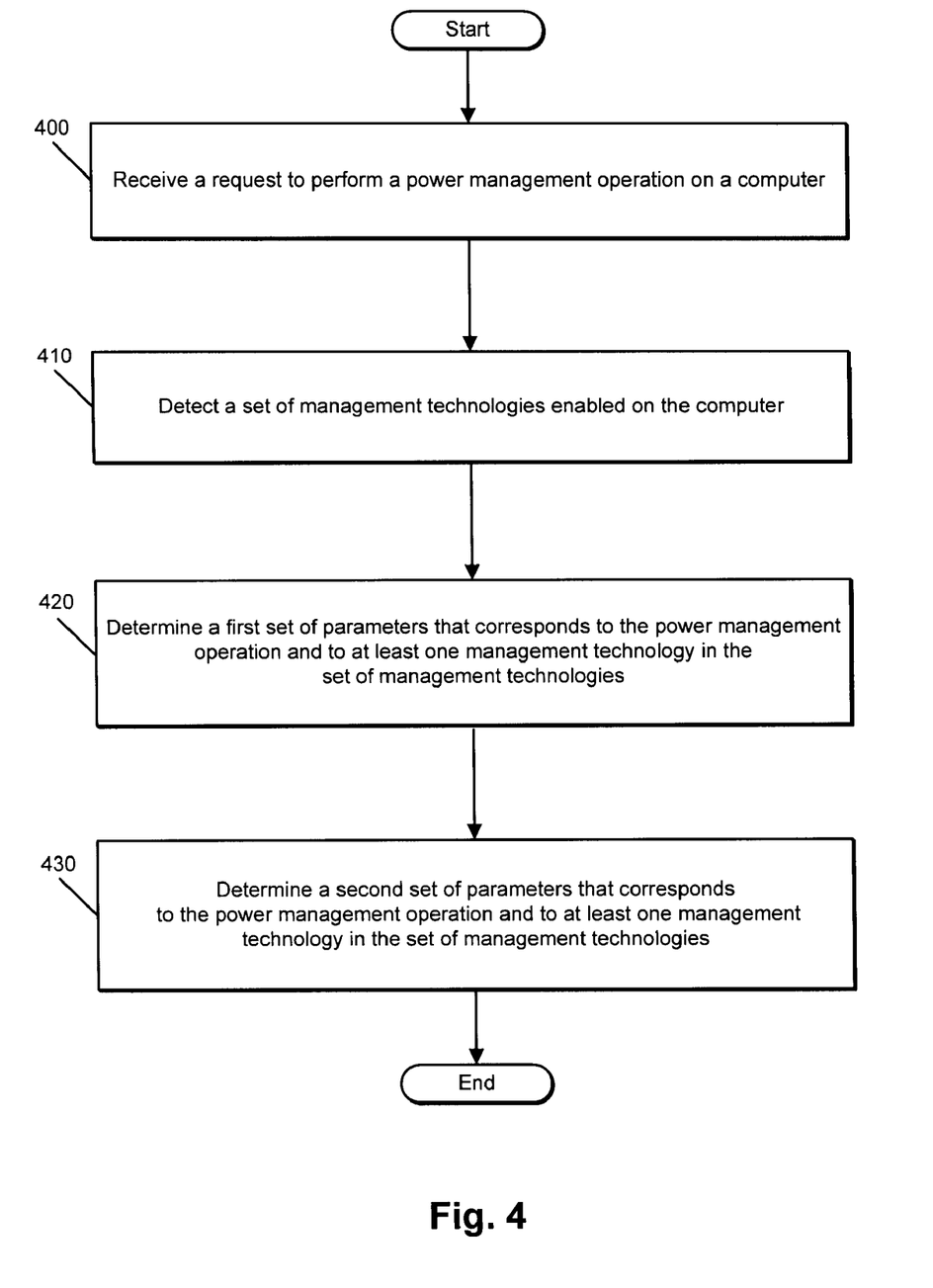
FIG. 4 is a flow diagram of an exemplary power management method according to certain embodiments.

FIG. 4 is a flow diagram of a power management method. As previously mentioned, a power management module may receive a request to perform a power management operation on a computer (step 400). The power management module may receive the request from another software program, an administrator, or any other software or hardware computer or network device. After receiving the request to perform the power management operation, the power management module may also receive an identification of the computer. Then, the power management module may detect a set of management technologies enabled on the computer (step 410). After detecting the set of management technologies enabled on the computer, the power management module may determine a first set of parameters that corresponds to the power management operation and to at least one management technology in the set of management technologies (step 420). Finally, the power management module may determine a second set of parameters that corresponds to the power management operation and to at least one management technology in the set of management technologies (step 430).

Figure 5:
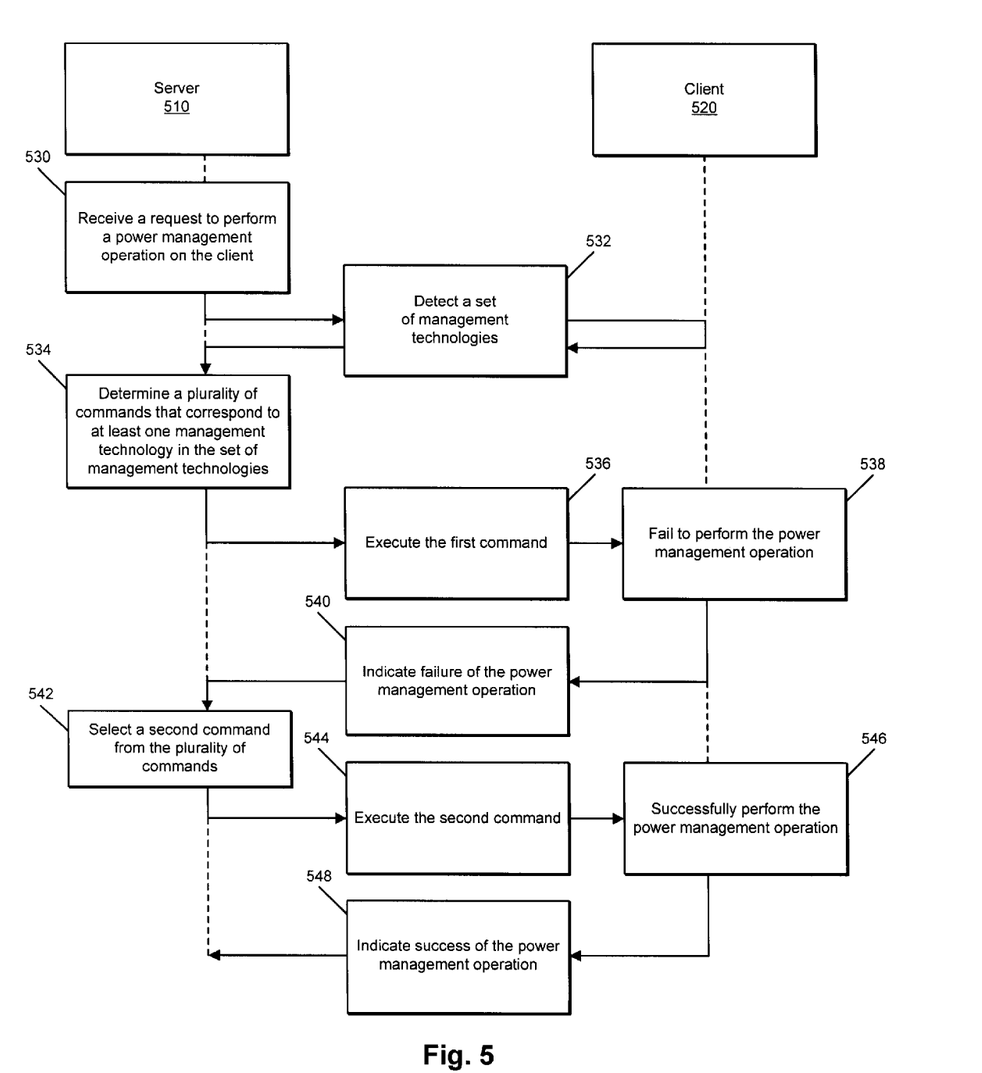
FIG. 5 is a flow diagram of exemplary server and client communications in a power management system according to certain embodiments.

FIG. 5 is a flow diagram of exemplary power management communications between a server 510 and a client 520. In some embodiments, server 510 may comprise a power management module, such as a real-time console infrastructure. Server 510 may receive a request to perform a power management operation on client 520 (step 530). Server 510 may then detect a set of management technologies on client 520 (step 532) and determine a plurality of commands that correspond to at least one management technology in the set of management technologies detected (step 534).

After determining a plurality of commands, server 510 may execute one of the commands from the plurality of commands by sending the command to client 520 (step 536). Client 520 may fail to perform the power management operation in response to the first command (step 538) and may send a server 510 an indication of the failure of the power management operation (step 540). In response to the failure indication, server 510 may select a second command from the plurality of commands (step 542) and execute the second command on client 520 (step 544). Client 520 may successfully perform the power management operation (step 546) in response to the second command and may send server 510 an indication of the successful completion of the power management operation (step 548).

Another example of how the power management technologies set forth herein may be applied is when an administrator wants to apply a security patch to an operating system. The administrator may want to apply the patch to both working computers and computers that are powered off. A power management module may switch a computer between different power states in a manner that is transparent to the administrator. For example, the power management module may power a computer on, allow the security patch to be installed, and then power the computer off.

Figure 6:
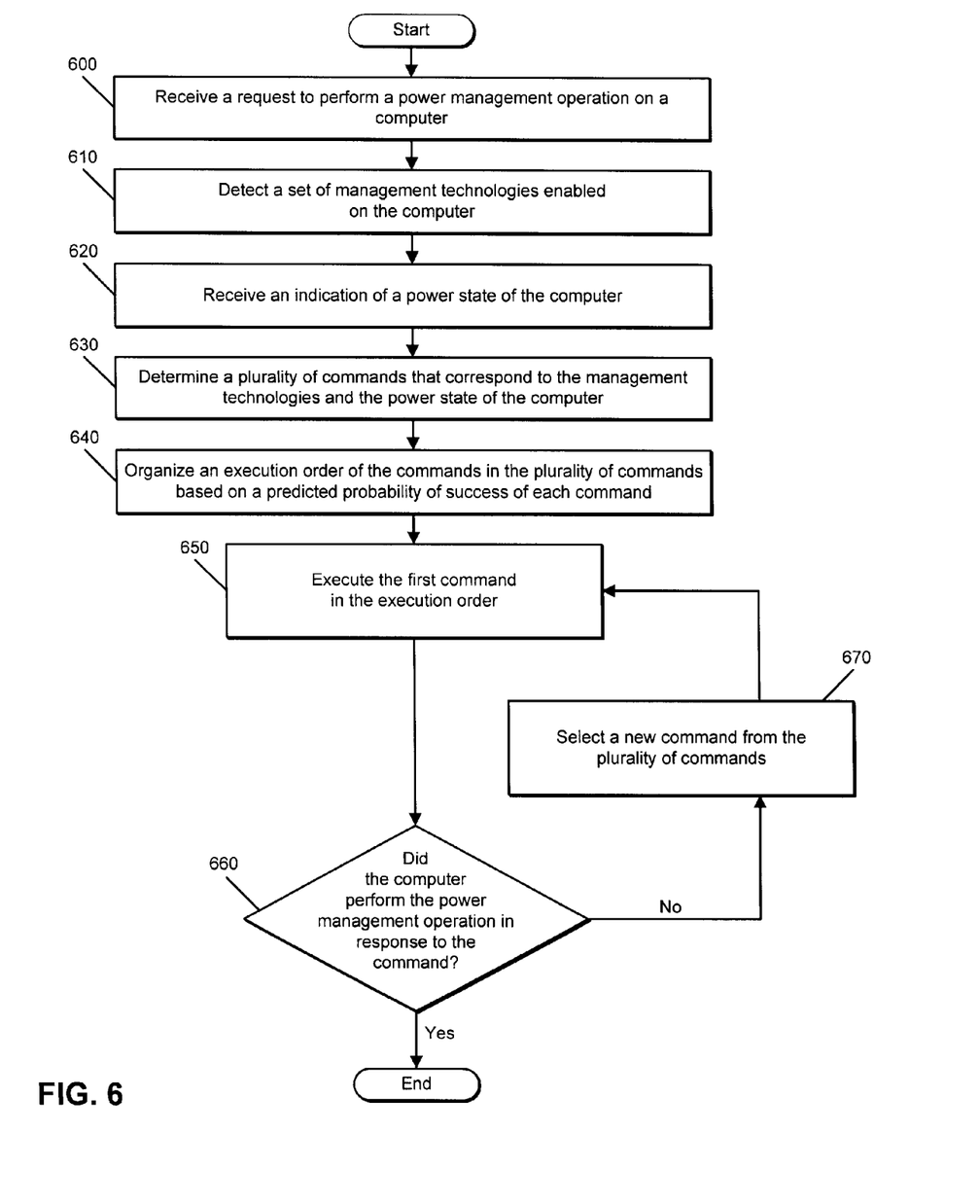
FIG. 6 is a flow diagram of an exemplary power management method according to certain embodiments.

FIG. 6 is a flow diagram of an exemplary power management method. First, a power management module may receive a request to perform a power management operation on a computer (step 600). Then, the power management module may detect a set of management technologies enabled on the computer (step 610). The power management module may also receive an indication of a power state of the computer (step 620). In some embodiments, the power management module may determine that the computer is powered off. In such embodiments, the power management module may be part of an out-of-band management solution that is capable of booting a powered-off computer. If the power management module is unable to determine the power state of the computer, the power management module may select commands based on a default power state.

The power management module may determine a plurality of commands that correspond to the management technologies and the power state of the computer (step 630). For example, if the power management operation is to fully power on the computer, the power management module may select one type of command for a computer that is in a hibernation power state and a different type of command for a computer that is in a standby power state.

The power management module may organize an execution order of the commands based on a predicted probability of success of each command (step 640). Then, the power management module may organize the execution order for the commands based on whether any of the commands have previously succeeded in causing the computer (or a computer with similar management technology configurations) to perform the power management operation.

The power management module may execute the first command in the execution order (step 650). If the computer does not successfully perform the power management operation in response to the first command (step 660), the power management module may select a new command from the plurality of commands (step 670). The power management module may continue to execute commands until the computer successfully performs the power management operation in response to a command.

Figure 7:
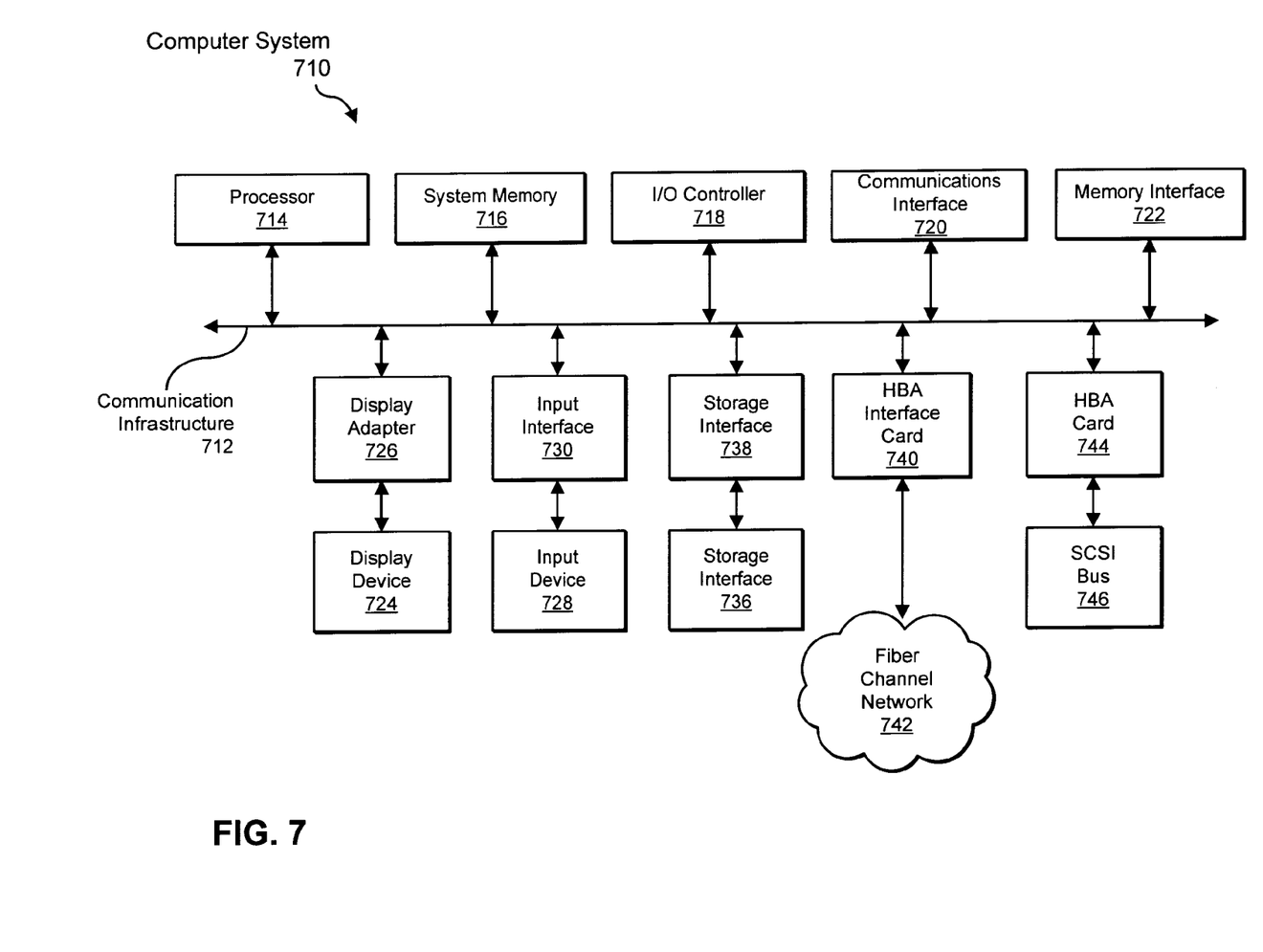
FIG. 7 is a block diagram of an exemplary computer system capable of implementing one or more of the exemplary embodiments described and/or illustrated herein.

FIG. 7 is a block diagram of an exemplary computer system 710 capable of implementing the methods and systems described and/or illustrated herein. Computer system 710 generally represents any single or multi-processor computing device capable of executing single-threaded or multi-threaded applications. Computer system 710 may include a communication infrastructure 712 that interconnects the major subsystems of computer system 710. Communication infrastructure 712 generally represents any form or structure capable of facilitating communication between one or more electronic components; including, for example, a communication bus (e.g., ISA, PCI, PCI-E, AGP, etc.) or a network.

As illustrated in FIG. 7, exemplary computer system 710 may comprise a processor 714, a system memory 716, an Input/Output (I/O) controller 718, a communication interface 720, and a memory interface 722. Processor 714 generally represents any type or form of CPU or other computing device capable of interpreting instructions and processing data. Instructions provided to processor 714 may cause processor 714 to perform the functions of one or more of the exemplary embodiments described and/or illustrated herein. The instructions provided to processor 714 may be instructions from a software application or module, and the methods described herein may be implemented as instructions in one or more software applications or modules. Processor 714 may execute any of the methods described herein. For example, processor 714 may perform and/or be a means for performing, either alone or in combination with other elements, one or more of the determining, performing, executing, detecting, and/or receiving steps described herein. Processor 714 may also perform and/or be a means for performing any other steps or processed described and/or illustrated herein.

System memory 716 generally represents any type or form of storage device or medium capable of storing data and/or other computer-readable instructions. Examples of system memory 716 include, without limitation, a random access memory (RAM) unit, a read only memory (ROM) unit, a flash RAM unit, or any other suitable memory device. In certain embodiments, system memory 716 may be used, for example, to store data. I/O controller 718 generally represents any type or form of computer board or module capable of coordinating and/or controlling the input and output functions of a computing device. I/O controller 718 may be used, for example, to perform and/or be a means for performing, either alone or in combination with other elements, one or more of the determining, performing, executing, detecting, and/or receiving steps described herein. I/O controller 718 may also be used to perform and/or be a means for performing other steps and features set forth in the instant disclosure.

Communication interface 720 generally represents a communication device capable of facilitating communication between exemplary computer system 710 and an additional device. For example, in certain embodiments communication interface 720 may interconnect computer system 710 with a private or public network comprising additional computer systems. Examples of communication interface 720 include, without limitation, a network interface (such as a network interface card), a wireless card, a modem, a communications port (such as a USB or FIREWIRE port), and any other suitable interface. In at least one embodiment, communication interface 720 may provide a direct connection to a remote server via a direct network link to the Internet. Communication interface 720 may also provide such a connection through, for example, an Ethernet connection, a modem, a digital cellular telephone connection, a BLUETOOTH network, an IEEE 802.11x wireless network, a digital satellite data connection, or any other suitable connection.

Communication interface 720 may allow computer system 710 to engage in distributed or remote computing. For example, communication interface 720 may receive instructions from a remote computer, or communication interface 720 may send instructions to a remote computer for execution. Accordingly, communication interface 720 may perform and/or be a means for performing, either alone or in combination with other elements, one or more of the determining, performing, executing, detecting, and/or receiving steps described herein. Communication interface 720 may also be used to perform and/or be a means for performing other steps and features set forth in the instant disclosure.

Memory interface 722 generally represents any type or form of device capable of allowing software and data to be transferred from a storage device to other components of computer system 710. For example, memory interface 722 may comprise a cartridge interface, a memory socket, or a disk drive. Memory interface 722 may also be a floppy drive, an optical disk drive, a flash interface, or any other type of memory interface. In certain embodiments, memory interface may perform and/or be a means for performing, either alone or in combination with other elements, one or more of the determining, performing, executing, detecting, and/or receiving steps described herein. Memory interface 722 may also be used to perform and/or be a means for performing other steps and features described and/or illustrated herein.

As illustrated in FIG. 7, computer system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724. Examples of display device 724 include, without limitation, CRT monitors, LCD screens, plasma screens, video projectors, and the like.

As illustrated in FIG. 7, exemplary computer system 710 may also comprise at least one input device 728 coupled to communication infrastructure 712 via an input interface 730. Input device 728 generally represents any type or form of user input device capable of providing input, either computer or human generated, to exemplary computer system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the determining, performing, executing, detecting, and/or receiving steps described herein. Input device 728 may also be used to perform and/or be a means for performing other steps and features set forth in the instant disclosure.

As illustrated in FIG. 7, exemplary computer system 710 may also comprise a storage device 736 coupled to communication infrastructure 712 via a storage interface 738. Storage device 736 generally represents any type or form of storage device or medium capable of storing data and/or other computer-readable instructions. For example, storage device 736 may be a magnetic disk drive (e.g., a so-called hard drive), a floppy disk drive, a magnetic tape drive, an optical disk drive, a flash drive, or the like. In certain embodiments, storage device 736 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 736 may also comprise other similar structures or devices for allowing computer software, data, or other computer-readable instructions to be loaded into computer system 710. For example, storage device 736 may be configured to read and write software, data, or other computer-readable information. Storage device 736 may also be a part of computer system 710 or may be separate device accessed through other interface systems. In certain embodiments, storage device 736 may be used, for example, to perform and/or be a means for performing, either alone or in combination with other elements, one or more of the determining, performing, executing, detecting, and/or receiving steps described herein. Storage device 726 may also be used to perform and/or be a means for performing other steps and features set forth in the instant disclosure.

In at least one embodiment, computer system 710 may also comprise a host bus adapter (HBA) interface card 740 and a HBA card 744. HBA card 740 may be operative to connect with a fiber channel network 742, and HBA card 744 may be operative to connect to a SCSI bus 746. HBA cards 740 and 742 may perform and/or be a means for performing, either alone or in combination with other elements, one or more of the determining, performing, executing, detecting, and/or receiving steps described herein.

In certain embodiments, computer system 710 may be any kind of computing device, including personal data assistants (PDAs), network appliances, X-WINDOW terminals, or other such computing devices. Computer system 710 may also be any type of device configured to execute the functions and modules described and/or illustrated herein. Computer system 710 may be a source computer, a destination computer, a server, or any other computing device discussed herein. The operating system provided on computer system 710 may be MS-DOS, MS-WINDOWS, OS/2, UNIX, LINUX, or any other operating system or platform. Computer system 710 may also support a number of Internet access tools; including, for example, an HTTP-compliant web browser having a JavaScript interpreter, such as NETSCAPE NAVIGATOR, MICROSOFT INTERNET EXPLORER, or other similar navigators.

Many other devices or subsystems may be connected to computer system 710. Conversely, all of the devices shown in FIG. 7 need not be present to practice the embodiments descried and/or illustrated herein. The devices and subsystems referenced above may also be interconnected in different ways from that shown in FIG. 7. Indeed, computer system 710 may use any number of software, firmware, and/or hardware configurations. For example, one or more of the exemplary embodiments disclosed herein may be encoded as a computer program (also referred to as computer software, module, software applications, computer-readable instructions, or computer control logic) and stored in a computer-readable medium. The computer-readable medium containing the computer program may then be loaded into computer system 710 using a removable storage drive or downloaded to computer system 710 via communication interface 720 over a communication path, such as the Internet or other network. All or a portion of the computer program stored on the computer-readable medium may then be stored in system memory 716 and/or various portions of storage device 736. According to certain embodiments, a computer readable medium may be an optical storage device, a magnetic storage device, or any other storage device capable of storing computer readable instructions. When executed by processor 714, a computer program loaded into computer system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, one or more of the exemplary embodiments disclosed herein may be implemented using various hardware components such as, for example, application specific integrated circuits (ASICs).

Figure 8:
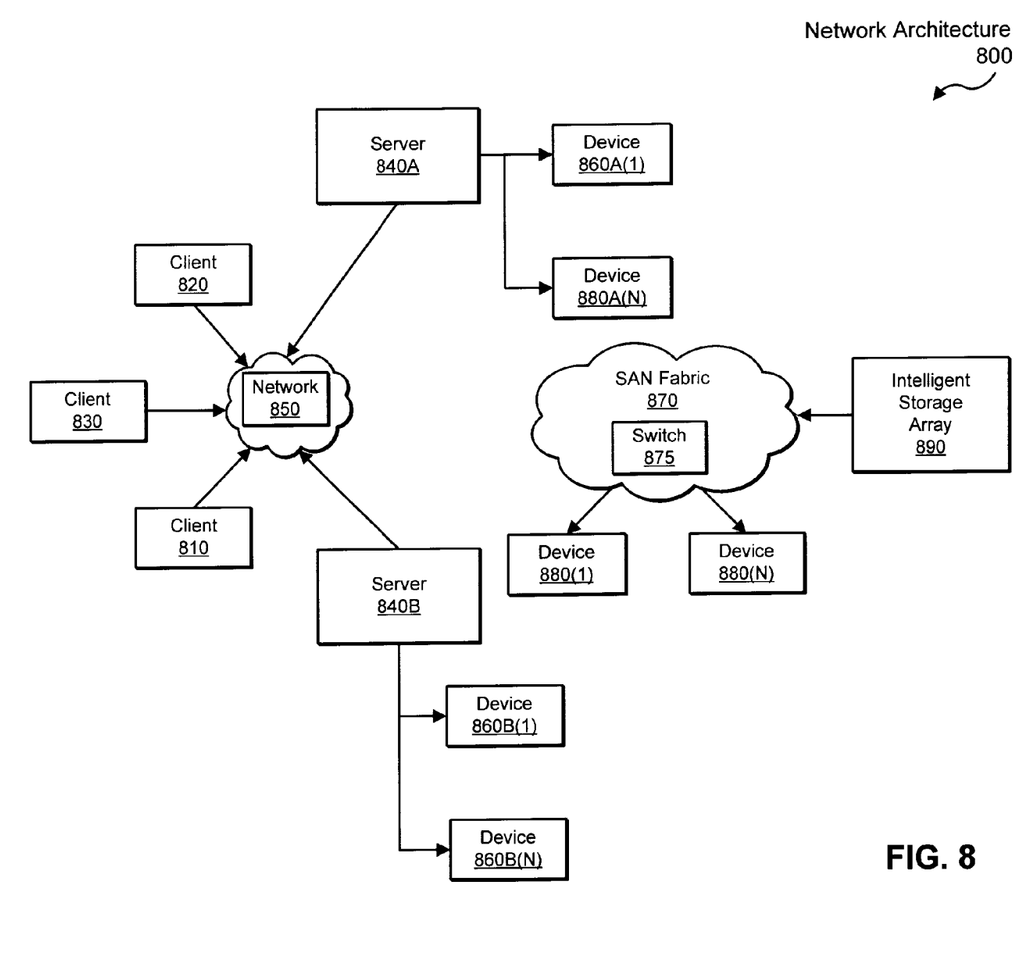
FIG. 8 is a block diagram of an exemplary network capable of implementing one or more of the exemplary embodiments described and/or illustrated herein.

FIG. 8 is a block diagram of an exemplary network architecture 800 in which client systems 810, 820, and 830, as well as storage servers 840A and 840B (any of which can be implemented using computer system 710), may be coupled to a network 850. As illustrated in this figure, storage server 840A may also comprise one or more storage devices 860A(1)-(N) directly attached thereto. Similarly, storage server 840B may comprise one or more storage devices 860B(1)-(N) directly attached thereto. In certain embodiments, storage servers 840A and 840B may be connected to a Storage Area Network (SAN) fabric 870, although connection to a storage area network is not required for operation of the embodiments described and/or illustrated herein. SAN fabric 870 may support access to storage devices 880(1)-(N) by storage servers 840A and 840B and by client systems 810, 820, and 830 via network 850. Intelligent storage array 890 is also shown as an example of a specific storage device accessible via SAN fabric 870.

In certain embodiments, and with reference to exemplary computer system 710 of FIG. 7, communication interface 720 (or some other method) may be used to provide connectivity from each client system 810, 820, and 830 to network 850. Client systems 810, 820, and 830 may be able to access information on storage server 840A or 840B using, for example, a web browser or other client software. Such software may allow client systems 810, 820, and 830 to access data hosted by storage server 840A, storage server 840B, storage devices 860A(1)-(N), storage devices 860B(1)-(N), storage devices 880(1)-(N), or intelligent storage array 890. Although FIG. 8 depicts the use of a network (such as the Internet) for exchanging data, the embodiments described and/or illustrated herein are not limited to the Internet or any particular network-based environment.

Storage servers 840A and 840B generally represent computing devices, such as an application servers or database servers, configured to provide various database services and/or to run certain software applications. Similarly, storage devices 860A(1)-(N), storage devices 860B(1)-(N), storage devices 880(1)-(N), and intelligent storage array 890 generally represent any type or form of storage device or medium capable of storing data and/or other computer-readable instructions.

In at least one embodiment, all or a portion of one or more of the exemplary embodiments disclosed herein may be encoded as a computer program and loaded onto and executed by storage server 840A, storage server 840B, storage devices 860A(1)-(N), storage devices 860B(1)-(N), storage devices 880(1)-(N), intelligent storage array 890, or any combination thereof. All or a portion of one or more of the exemplary embodiments disclosed herein may also be encoded as a computer program, stored in server 840A, run by server 840B, and distributed to client systems 810, 820, and 830 over network 850. For example, network architecture 800 may perform and/or be a means for performing the steps described herein. Network architecture 800 may also include one or more of the server, the destination computer, and the source computer.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

While the foregoing disclosure sets forth various embodiments using specific block diagrams, flowcharts, and examples, each block diagram component, flowchart step, operation and/or component described and/or illustrated herein may be implemented, individually and/or collectively, using a wide range of hardware, software, or firmware (or any combination thereof) implementations. In addition, while a number of exemplary equations and algorithms have been described herein, any type, form, or number of equations, algorithms, or heuristics may be used to accomplish one or more of the embodiments described or illustrated herein.

The foregoing disclosure also describes embodiments including components contained within other components. Such architectures are merely examples, and many other architectures can be implemented to achieve the same functionality. Similarly, the process parameters and sequence of steps described and/or illustrated herein are given by way of example only and can be varied as desired. For example, while the steps illustrated and/or discussed in FIGS. 1 and 4-6 may be shown or discussed in a particular order, these steps do not necessarily need to be performed in the order illustrated or discussed. In addition, the various exemplary methods described and/or illustrated herein may omit one or more of the steps described or illustrated herein or include additional steps in addition to those described or illustrated.

Furthermore, while various embodiments have been described and/or illustrated herein in the context of fully functional computer systems, one or more of the exemplary embodiments described and/or illustrated herein may be capable of being distributed as a program product in a variety of forms, regardless of the particular type of signal bearing media used to actually carry out the distribution. Examples of signal bearing media include recordable media such as floppy disks and CD-ROM, transmission type media such as digital and analog communications links, as well electronic storage media, magnetic storage media, optical storage media, communications medium conveying signals encoding instructions, and other distribution systems.

In addition, one or more of the embodiments described and/or illustrated herein may be implemented using software modules and scripts that perform certain tasks. The software modules and scripts discussed herein may include script, batch, or other executable files. In addition, these software modules and scripts may be stored on a machine-readable or computer-readable storage medium, such as a disk drive. In some embodiments, the modules and scripts can be stored within a computer system memory to configure the computer system to perform the functions of the module. One or more of the steps discussed herein may be automated by a computer. In some embodiments, all of the steps performed by a module or application may be automated by a computer.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

The power management techniques discussed herein may provide a transparent power management system and/or method that works with various different technologies, computer systems, and power states. Thus, an administrator may be able to effectively manage a network without knowing the specific power management parameters for the computers in the network.

What is claimed is:

1. A computer-automated method comprising:
    determining a plurality of commands, the plurality of commands comprising first and second commands;
    organizing an execution order of each command in the plurality of commands based on a predicted probability of success of each command;
    performing an iterative execution process, the iterative execution process comprising:
        causing the first command to be executed on a computer;
        determining whether the computer performed a power management operation in response to the first command;

ending the iterative execution process when the computer performs the power management operation in response to the first command;

causing the second command to be executed when the computer fails to perform the power management operation in response to the first command.

2. The computer-automated method of claim 1, wherein determining the plurality of commands further comprises:

detecting a power management technology enabled on the computer;

determining a first set of parameters that corresponds to the management technology, wherein the first command includes the first set of parameters;

determining a second set of parameters that corresponds to the management technology, wherein the second command includes the second set of parameters.

3. The computer-automated method of claim 1, wherein determining the plurality of commands further comprises:

detecting a first management technology enabled on the computer;

determining a first set of parameters that corresponds to the first management technology, wherein the first command implements the first set of parameters;

detecting a second management technology enabled on the computer;

determining a second set of parameters that corresponds to the second management technology, wherein the second command implements the second set of parameters.

4. The computer-automated method of claim 1, wherein organizing the execution order of each command in the plurality of commands further comprises determining whether the first or second commands previously succeeded in causing the computer to perform the power management operation.

5. The computer-automated method of claim 1, further comprising:

receiving an indication of a power state of the computer;

determining the plurality of commands based on the power state of the computer.

6. The computer-automated method of claim 1, wherein:

the first command is a management instrumentation command;

the second command is at least one of an alert format command and a management technology command.

7. The computer-automated method of claim 1, further comprising:

receiving an indication of the power management operation;

receiving an identification of the computer.

8. A computer-automated method comprising:

receiving a request to perform a power management operation on a computer;

detecting a set of management technologies enabled on the computer;

determining a first set of parameters that corresponds to the power management operation and to at least one management technology in the set of management technologies;

determining a second set of parameters that corresponds to the power management operation and to at least one management technology in the set of management technologies;

organizing an execution order of each set of parameters based on a predicted probability of success of each set of parameters.

9. The computer-automated method of claim 8, further comprising:

determining a first command, wherein determining the first command comprises determining the first set of parameters;

determining a second command, wherein determining the second command comprises determining the second set of parameters;

performing an iterative execution process, the iterative execution process comprising:

executing the first command on the computer;

determining whether the computer performed the power management operation in response to the first command;

ending the iterative execution process when the computer performs the power management operation in response to the first command;

executing the second command when the computer fails to perform the power management operation in response to the first command.

10. The computer-automated method of claim 8, wherein the set of management technologies comprises a single management technology.

11. The computer-automated method of claim 8, wherein:

the set of management technologies comprises first and second management technologies, the first set of parameters corresponds to the first management technology;

the second set of parameters corresponds to the second management technology.

12. A computer-automated method comprising:

receiving a request to perform a power management operation on a computer;

detecting a set of management technologies enabled on the computer;

determining a first command that corresponds to the power management operation and to at least one management technology in the set of management technologies;

determining a second command that corresponds to the power management operation and to at least one management technology in the set of management technologies;

organizing an execution order for the first and second commands based on a predicted probability of success of each command;

performing an iterative execution process, the iterative execution process comprising:

executing the first command on the computer;

determining whether the computer performed the power management operation in response to the first command;

ending the iterative execution process when the computer performs the power management operation in response to the first command;

executing the second command when the computer fails to perform the power management operation in response to the first command.

13. The computer-automated method of claim 12, wherein the set of management technologies comprises a single management technology.

14. The computer-automated method of claim 8, wherein:

the set of management technologies comprises first and second management technologies, the first command corresponds to the first management technology;

the second command corresponds to the second management technology.

15. A computer-readable medium, comprising:
a first set of computer-executable instructions operable to determine a plurality of commands, the plurality of commands comprising first and second commands;
the first set of computer-executable instructions are further operable to organize an execution order of each command in the plurality of commands based on a predicted probability of success of each command;
a second set of computer-executable instructions operable to perform an iterative execution process, the iterative execution process comprising:
  causing the first command to be executed on a computer;
  determining whether the computer performed a power management operation in response to the first command;
  ending the iterative execution process when the computer performs the power management operation in response to the first command;
  causing the second command to be executed when the computer fails to perform the power management operation in response to the first command.

16. The computer-readable medium of claim 15, wherein the first set of computer-executable instructions is further operable to:
  detect a management technology enabled on the computer;
  determine a first set of parameters that corresponds to the management technology, wherein the first command includes the first set of parameters;
  determine a second set of parameters that corresponds to the management technology, wherein the second command includes the second set of parameters.

17. The computer-readable medium of claim 15, wherein the first set of computer-executable instructions is further operable to:
  detect a first management technology enabled on the computer;
  determine a first set of parameters that corresponds to the first management technology, wherein the first command implements the first set of parameters;
  detect a second management technology enabled on the computer;
  determine a second set of parameters that corresponds to the second management technology, wherein the second command implements the second set of parameters.

18. The computer-readable medium of claim 15, further comprising:
  a third set of computer-executable instructions operable to receive an indication of a power state of the computer;
  a fourth set of computer-executable instructions operable to determine the power management operation based on the power state of the computer.

19. The computer-readable medium of claim 15, wherein:
  the first command is a management instrumentation command;
  the second command is at least one of an alert format command and a management technology command.

20. The computer-readable medium of claim 15, further comprising:
  a third set of computer-executable instructions operable to receive an indication of the power management operation;
  a fourth set of computer-executable instructions operable to receive an identification of the computer.

* * * * *